July 19, 1927.　　　　　　　　　　　　　　　1,636,112
E. SCHÜFFTAN
SYSTEM OF TAKING PHOTOGRAPHIC AND CINEMATOGRAPHIC PICTURES
Filed Aug. 9, 1926　　　　3 Sheets-Sheet 1

Inventor.
Eugen Schüfftan
BY
ATTORNEYS

Witness
Harry R. Seidel

July 19, 1927.
E. SCHÜFFTAN
1,636,112
SYSTEM OF TAKING PHOTOGRAPHIC AND CINEMATOGRAPHIC PICTURES
Filed Aug. 9, 1926   3 Sheets-Sheet 2
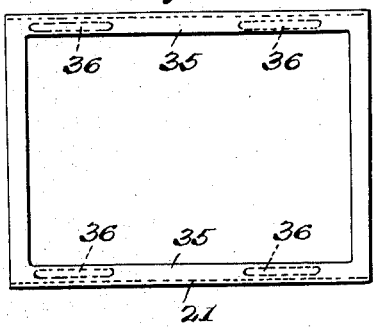
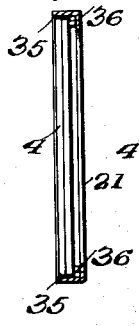
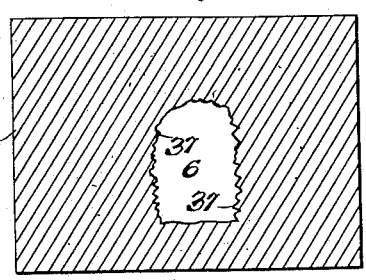
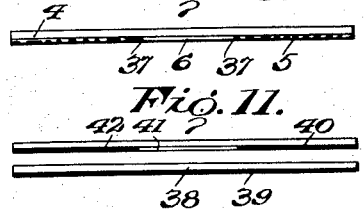
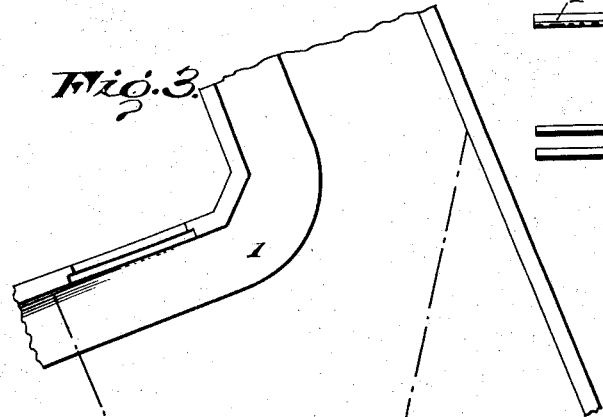
Inventor
Eugen Schüfftan
ATTORNEYS
Witness
Harry R. Seidel

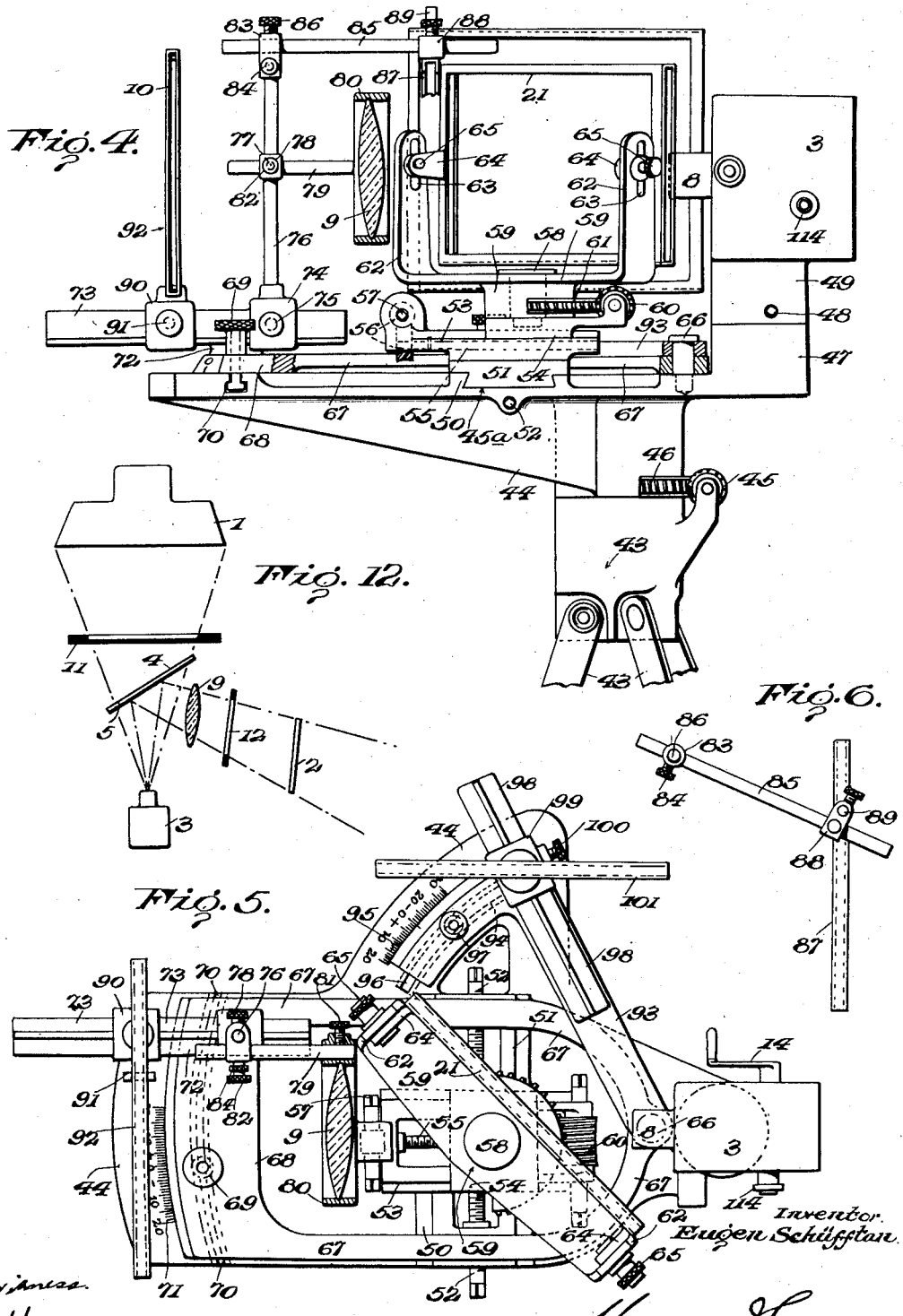

Patented July 19, 1927.

1,636,112

UNITED STATES PATENT OFFICE.

EUGEN SCHÜFFTAN, OF HOLLYWOOD, CALIFORNIA.

SYSTEM OF TAKING PHOTOGRAPHIC AND CINEMATOGRAPHIC PICTURES.

Application filed August 9, 1926. Serial No. 128,152.

This invention is concerned with improvements in the production of photographic and cinematographic takings at which objects of different scale are united within the camera and by means of a mirror to a picture corresponding picturally and as to the scale of the picture parts to the conditions required, the unison by means of the mirror being effected by the mirror being provided with a mirror foil at its camera facing side and being made transparent or light permeable by the mirror foil being eliminated at certain places, so that one sees at the permeable places the object arranged behind the mirror, whereas the reflecting portion of the mirror produces a reflection the complement to the through-sight object.

In order to obtain from the objects to be taken a picture of uniform depth of sharpness with an objective set at a certain focal distance, it is necessary that the camera be at such a distance from the objects that the objective of the camera must be brought into a position with relation to the film which is termed infinite-position. This infinite position requires a minimum distance of the objects to be taken from the camera which cannot be underpassed. It is therefore necessary that the scenery part or the object which is to serve as the main portion of the whole taking be at such a distance from the apparatus that the actors are in any position, be it in the fore- or in the back-ground, reproduced in the camera with sufficient sharpness.

The complementary object, however, is normally of a different scale, preferably of a smaller scale being a model, a photography, a diapositive, a stationary projection picture or a cinematographic picture. This object, however, must for the sake of producing the proper scale, be located very closely to the camera, so that it is at a distance therefrom which is smaller as the minimum distance for the infinite position of the objective. With the objective being in its infinite position a sharp picture of such object could accordingly not be obtained in the camera.

In order, however, that this object also may be reproduced within the camera with sufficient sharpness, I so interpose between this object and the camera a lens or lens combination that the picture thrown in the camera from the second object is brought to the same setting plane as the picture of the first object whereby a combined picture is produced corresponding picturally and as to its scale to the picture of the first object.

By the use of the lenses or of the lens combination one is thus in a position to produce the most various photographic and cinematographic combination takings without comprehensive scenery constructions being necessary. Upon using a cinematographic projection picture one can also use an already existing film taking and add to it a complementary action. By a suitable choice of the picture produced by the lens combination and by suitably positioning the complementary picture effects can be produced which before were possible with the most costly and extensive scenery structures only.

The lens or lens combination not only aids in bringing the images into the proper plane in the camera and at the proper scale but also delineates to a nicety or brings out more distinctly the blending of the overlapped edges of the images for the full width thereof throughout the blending zone. The width of the blending zone is controlled by moving the mirror with its window towards or away from the camera but by employing the lens in conjunction with the mirror the distinctness of the full width of the blending zone is clearly brought out. The blending zone comprises that portion of the composite image where the adjacent portions of the two images are disposed in overlapped relation.

A further important feature of my invention is to be considered in the arrangement of means whereby the support or the lens or lens combination does interfere with the picture or is not imaged in the camera. Lenses or lens combination can if they are to be of a sufficient high grade quality be produced up to certain diameters only. It is further to be taken into consideration that with any lens only a portion of the diameter can in fact be made use of if picture distortions are to be avoided. This condition requires that the lens must be approached relatively close to the camera.

The nearest possible position to the camera depends however, from the arrangement of the mirror which must be so located with relation to the camera that no part of the camera can reflect in the mirror. The window of the mirror which permits the view to the one object may not be larger as the available diameter of the lens or lens combination so that neither the support nor the outer marginal portion of the lens which might result in a picture distortion are within the range of the mirror window.

As already mentioned, the mirror is generally arranged very close to the camera. It is therefore practically not possible to outline the mirror window permitting the through-sight so sharply that a good pictural mergence or transition can be obtained on the taking film at the contours or outlines. In order to obtain a good contouring I therefore interpose non-actinic masks between the lens combination and the one object and between the mirror and the other object which masks however may be at such a distance only from the camera that their outlines still appear a little unsharp in the camera, so that they merge or dim on the film whereby a soft mergence or transition of both picture parts is obtained.

If for the reflection a semi-transparent mirror is used, that is a mirror having its mirror film or foil facing the camera of such a thinness that it normally appears transparent, one must arrange a black backing behind the mirror and provide such backing with a window for the through-sight, such window corresponding to the scraped off window portion of the non-transparent or impermeable mirror.

As before mentioned the window in the mirror or in the black mask backing the same may only be so great that it does not come too close to the margins of the lens. In many instances the picture section obtained therewith is not sufficient and a shift or displacement of the lens must be effected in order that another picture section may be taken. In this instance it is preferred to use for the taking a semi-transparent mirror since the mirror must remain stationary, only the lens, the masks and the black backing behind the mirror being shifted and given a new adjustment. These adjustments can be effected following graduations which before have been fixed for any individual object.

For those skilled in this particular art it will be readily clear that the lens can also be set into the ray cone of the reflection if this should be required by the picture. In this instance the reflecting surface of the mirror may be so great only that it can never reflect the support and the margins of the lens.

In order that the invention may be clearly understood and readily carried into effect, reference may besides be had to the accompanying drawings, in which:—

Figure 3 is the diagram of a modification at which the lens is interposed into the ray cone of the mirage.

Figure 4 is a side view with parts in section.

Figure 5 is a plan view of the mirror and its support for the lens or lens combination, with parts in section.

Figure 6 is a detail to Figures 4 and 5.

Figures 7 and 8 are side view and cross section of a frame, that may be used for holding the mirror or the masks and backings.

Figures 9 and 10 are side view and plan view of a mirror having its mirror foil partly eliminated.

Figure 11 is the plan view of a semi-transparent mirror having a backing behind it.

Figure 12 shows more or less diagrammatically an arrangement with the lens disposed in the ray cone of the reflection.

Figures 1, 2:
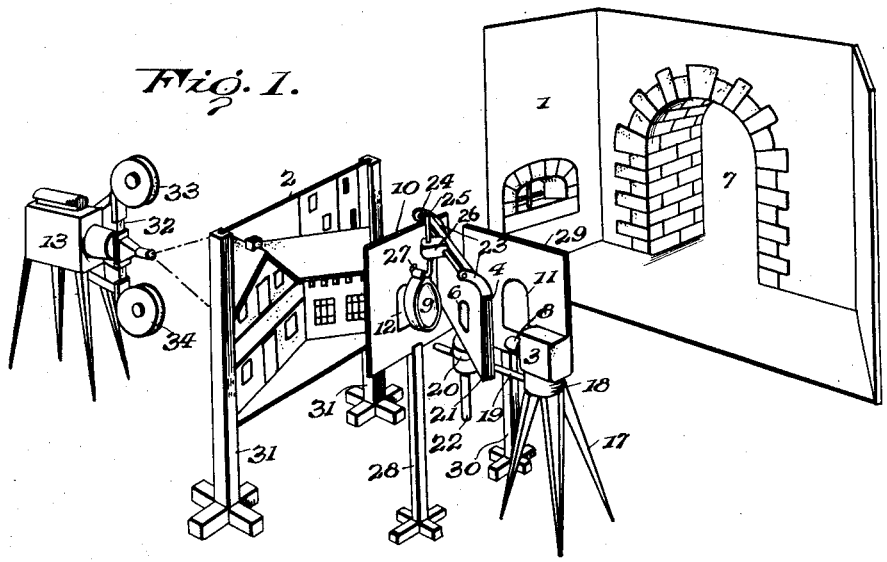
Figure 1 is a perspective view of an embodiment of my invention.
Figure 2 is a diagrammatical plan view of the arrangement shown in Figure 1, with parts in section.

In Figure 2 in connection with which 1 shall first describe in which way a picture is produced in the camera of two complementary objects of a different scale the numerals 1 and 2 designate the two objects an interfitting picture of which shall be produced in the camera 3, the object 1 being for example a castle door whereas the object 2 represents the interior of the castle yard as far as it may be seen through the castle door. In order now to picturally unite in the camera the two objects 1 and 2, I interpose a mirror 4 into the ray cone between the object 2 and the camera 3 which mirror is at its side facing the camera 3 provided with a mirror foil 5. This mirror foil 5 is eliminated or scraped off at the portion 6 corresponding to the through-sight through the castle door 7 of object 1 (see also Figures 9 and 10). Upon taking the picture by means of the camera 3 the same is taking simultaneously the reflection of object 1 and the object 2 as viewed through the mirror 4 and if the objects 1 and 2 are in accordance with their scale set or positioned at the proper distance from the camera a picturally interfitting picture of both objects is produced in and by the camera.

In view of the size of the taking studio the object 1 on or before which the acting persons are playing will be positioned at such a distance from the camera only that with the camera objective 8 being set or adjusted to its infinite position the foreground or object 1 still appears sharply. The complementary object 2 will however be of another scale as object 1, preferably of a smaller scale, in order to save space. In this instance the object 2 must be approached very close to the camera 3 in order that a pictural interfitting with object 1 may be obtained in the camera. In other words the object 2 is to be at such a distance from the camera that with the objective 8 thereof being in its infinite-adjustment the reproduction in the camera does not become any more of sufficient or satisfactory sharpness.

In order to provide for this drawback I interpose between the mirror 4 and the object 2 a lens combination 9 which readjusts or restores the picture of object 2 to the same adjustment plane as the picture of object 1. The lens combination 9 thus permits to place the object 2 at any distance from the camera since by a suitable choice of the lens combination any desired effect can be produced.

The lens combination 9 to which I shall hereafter always refer as to "lens 9" can however be manufactured up to a certain diameter if it is to operate satisfactorily. Besides the margins of the lens cannot be used for taking purposes because they might be liable to produce a picture distortment or interference. Accordingly the mirror 4 must be approached very close to the camera 3 in order that also the lens 9 will be as near as possible to the camera. The window 6 of the mirror 4 however is to be so great only that the support of the lens and the lens margins are outside of the ray cone passing through the window 6 to the object 2 in order that a distortion or interference of the picture can be avoided.

On account of the extremely small distance at which the mirror is arranged from the camera 3 it is in certain instances difficult to work out the window 6 on the mirror 4 with the necessary exactness. On the other hand, the margins or outlines of the window 6 are reproduced so unsharply in the camera that too strong overlappings of the individual reproductions of objects 1 and 2 are produced.

In order to provide for this inconvenience, I interpose into the ray cones between the mirror 4 and object 1 and between the lens 9 and the object 2 non-actinic masks 10 and 11, that is masks which are photographically inactive, of which the mask 10 is provided with a window 12 corresponding to the castle door 7 whereas the mask 11 corresponds to the castle door 7 as to its outer shape. The masks 10 and 11 are arranged at such a distance from the camera 3 that their outlines are, with the objective 8 being in its infinite position, not reproduced with complete sharpness. The outlines therefore appear in no instance sharply so that between the two reproductions of the objects 1 and 2 a soft transition is produced on the taking film at the place of transition.

The object 2 can be a natural object, a photography, a diapositive, a stationary or even a movable projection picture. In case of its being a projection picture, the same is produced by a projection apparatus 13 which at the embodiment illustrated throws a picture from the back side of the object onto the translucent screen 2. The projection picture must be as small as possible in order that a sufficiently clear picture adapted to be photographed may be obtained with a small source of light and without light losses.

If a cinematographic picture is thrown by the apparatus 13 on the screen 2 it is necessary that the projection apparatus cooperates synchronously witn the taking apparatus in such a way that at the moment of the complete opening of the projection apparatus the taking in the camera is effected. To this end the mechanism 14 of the camera 3 can be connected with the mechanism 15 of the projection apparatus by means of a clutch 114 and flexible shafting 16 or in another known or suitable way adapted to produce synchronism.

In Figure 1 the individual parts reappearing are designated with the same reference numerals as in Figure 2. The camera 3 is carried on a standard 17, the head 18 of which is provided with a bracket 19. On this bracket 19 a clamping device 20 is slidably supported carrying a frame 21 adapted to be vertically adjusted by means of stud 22. The frame 21 receives the mirror 4 which can be shifted within the frame 21 and is held in its position by clamping springs.

The frame 21 is provided with two brackets 23 carrying a rod 24 along which a carriage 26 can be displaced and adjusted in different positions. The member 26 is provided with an adjustable rod 25 carrying the lens 9 by means of an eyelet 27, whereby the lens 9 can be adjusted into any desired position with relation to the mirror 4 or the window 6 thereof.

The mask 10 is carried by the standard or post 28. The mask 11 is preferably painted or pasted on a glass plate 29 carried by a post 30. The object 2 which can be a translucent screen is carried by the standards or posts 31. The projection apparatus 13 is normally a cinematographic projection apparatus, the film 32 running from the roll 33 to the roll 34.

The mirror 4 (Figures 7—10) is supported in the frame 21. This frame 21 is provided with guides 35 along which the mirror 4 is adapted to slide, springs 36 being provided for locking it in its respective positions. The window 6 of mirror 4 is produced by scraping off or out the mirror foil 5 (Figures 9 and 10). The outlines 37 are not drawn, however, in straight lines as this would correspond to the outline or contour of the castle door 7, but are drawn in erratic or broken lines in order that a certain unsharpness of the outlines 37 be obtained warranting a soft transition.

In many instances it is preferred to use a semi-transparent mirror 38 (Figure 11)

instead of the impermeable mirror 4 in order that the scraping out of the mirror foil is avoided. Such semi-transparent mirrors are also provided at their camera facing side or surface with a mirror foil 39 of such a thinness that the mirror ordinarily appears completely light permeable or transparent. If, however, such mirror is backed by a black surface 40 it becomes a complete and completely reflecting mirror. Instead of the out scraped portion 6 I now arrange in the black surface 40 a corresponding window 41 so that the semi-transparent mirror 38 results in its combination with the black backing 40 having the window 41 in exactly the same effect as the before-described mirror 4. The black surface 40 is preferably produced on a glass plate 42. This permits that the glass plate 42 having the black surface 40 can be slid into the guide 35 of frame 21 together with the semi-transparent mirror 38.

It is however not absolutely necessary that the black surface is in immediate contact with mirror 38, it may also be arranged at a certain distance behind it, it being only necessary that the through-sight through or the transparency of the semi-transparent mirror be backed in black at the places at which it is to reflect.

While I have now described an arrangement at which the lens 9 is interposed into the ray cone passing through the mirror 4 I have illustrated in Figure 3 and shall now describe an embodiment at which the object 2 is so positioned within the ray cone of the through-sight through mirror 4, that it appears sharply in the camera, whereas the lens 9ª is arranged in the ray cone of the reflection of object 1. Since the object 1 is at a greater distance as corresponds to its scale, the lens 9ª must be of such a different nature and so vary the picture of object 1 that the same fits as to its size into the picture of object 2. By a suitable choice of the lenses one can produce any desired combination of the pictures which before were possible by means of trick drawings only.

As before mentioned, lenses suitable for the purposes of my invention can be manufactured free from objection up to a certain size only. It frequently occurs however, that the play field to be grasped by the lens is larger than the maximum ray angle of the lens. In order that a playing over the whole play field of the scene may be permitted in such instance care must be taken that the lens can at will be aimed to the single play field portions. Upon displacement of the lens, however, all of the other parts with the exception of the camera must be shifted and that symmetrically in such a way that the parts or portions pertaining to the object 1 are shifted or displaced in opposition to those of object 2 since the object 1 is positioned in the reflective image of object 2.

An embodiment permitting such use is illustrated in Figures 4–6. According to this embodiment I have a base plate 44 rotatably carried on a standard 43, a worm 45 and a worm gear segment 46 permitting the rotation of said plate 44 around a vertical axis. The base plate 44 is at its rear end provided with a bracket 47 upon which the head 49 carrying the camera 8 can be adjusted by means of mechanism 48. The base plate is further provided with a dove-tailed guide 45ª in which a slide 51 can be shifted horizontally and transversely to the base plate 44 by means of a spindle 52. The slide 51 carries a support 53 on which a carriage 54 can be shifted by means of a spindle 55. The spindle 55 is actuated by worm gears 56 and shaft 57.

On the carriage 54 a bolt 58 is supported around which a support 59 can be rotated by means of a worm 60 and a worm gear segment 61. The support 59 is provided with two upwardly projecting arms 62 having at their upper ends slots 63 in which bearing lugs 64 are adjustably carried and adjustable by means of screws 65. These bearing lugs 64 are carrying the frame 21, so that the mirror 4 received by the said frame can exactly be adjusted in any direction.

The base plate 44 is further carrying independent from the mirror support and rotatable around a bolt 66 arranged below the center of the camera objective a frame comprising two arms 67 which are connected by a plate 68 at their forward end. The plate 68 can be locked in different positions with relation to the base plate 44 by a setting screw 69 and a T-shaped slot 70, a graduation 71 facilitating the adjustment.

The plate 68 is carrying by means of a bracket 72 a prism rail 73 on which a slide piece 74 can be adjusted and locked by a screw 75 in different positions. The member 74 carries a rod 76 on which a block 77 can be locked in different adjustments by a screw 78. The block 77 provided with a locking screw 82 carries the rod 79 to which the lens 9 or its support 80 respectively is attached by means of screw 81.

The rod 76 supports at its upper end by means of a screw 84 a second block 83 to which a rod 85 is adjustably connected by means of set screw 86. This rod 85 is carrying by means of a block 88 a frame 87 which may be vertically adjusted by a rod 89. The frame besides is of exactly the same construction as frame 21 and receives the block backing 40, 41, 42.

The prism rail 73 is further adjustably carrying a slide member 90 adapted to be locked by a screw 91 and carrying a frame 92 into which the mask 10 can be slid.

Around the stud 66 an arm 93 is further rotatably carrying at its forward end a segment 94 which can be adjusted according to a graduation 95 corresponding to the graduation 71 and can be locked by a screw 97 sliding within a T-shaped slot 96. The arm 93 is carrying a prism rail 98 carrying a slide block 99 which can be locked in different positions by a screw 100 and carries a frame 101 into which the mask 11 can be slid. The graduations 71 and 95 are alike and provided on both sides of their zero-point with opposite indices in order that the adjustments may always be effected in the proper direction.

It will be appreciated that it is immaterial whether scene 1 or 2 is photographed by reflection or directly through the mirror window. However, in either case the lens 9 as shown in Figures 2 and 12, must be disposed across the ray cone from the miniature 2. Therefore the camera and the mirror may be so positioned relative to the two scenes that either may be photographed directly through the sight window or by reflection from the mirror.

It is to be borne in mind that wherever the words "miniature set or scene or objects" are employed it is to be construed as designating some such miniature reproduction as a painting, a photograph, a diapositive or a model.

In order to more fully explain the action of the mirror and transparent member in producing blending of the adjacent edges of the interfitting images, it is necessary to refer to the position of the mirror with respect to the camera 3 and scenes 1 and 2. The mirror 4 is placed in the ray cone from scenes 1 and 2 and at such a point therein where the edges of the mirror will appear unsharp, whereby when the images of the two scenes are viewed in the camera or are formed on the negative the adjacent edges of the two images will overlap for a space which I term a zone of mergence. This zone varies in width in accordance with the position of the mirror 4 relative to the camera 3. The nearer the mirror is placed to the camera the wider the zone of transition of the zone of blending while the farther away the mirror from the camera the narrower is the zone of mergence.

What I claim is:

1. The art of making composite motion pictures of a set or scene and a second set or scene which comprises arranging a light transmitting member between the first set or scene and the camera, forming an image of a portion of the first set or scene directly through the light transmitting member on a frame of the camera, simultaneously forming an image of the second set or scene on the same frame by a reflecting surface on the light transmitting member and at the same time causing overlapping of the adjacent portions of the images in a zone of mergence, said light transmitting member extending beyond the reflecting surface for blending in the zone of mergence the overlapped edges of the two images into each other by the coordination of the reflecting surface and the transparent member, and bringing out the distinctness of the blending zone for the full width thereof by a lens disposed transversely of a light cone from one of the scenes and between the reflecting surface and the last mentioned scene.

2. The art of making composite motion pictures of a set or scene and a second set or scene which comprises arranging a light transmitting member between the first set or scene and the camera, forming an image of a portion of the first set or scene directly through the light transmitting member on a frame of the camera, simultaneously forming an image of the second set or scene on the same frame by a reflecting surface on the light transmitting member and at the same time causing overlapping of the adjacent portions of the images in a zone of mergence, said light transmitting member extending beyond the reflecting surface for blending in the zone of mergence the overlapped edges of the two images into each other by the coordination of the reflecting surface and the transparent member, and controlling the distinctness of the blending zone for the full width thereof by a lens located exteriorly of the camera, disposed transversely of a light cone from one of the scenes and between the reflecting surface and the last mentioned scene and at the same time causing interfitting of the two images in accordance with the proper scale.

3. The art of making composite motion pictures of a set or scene and a second set or scene which comprises arranging a light transmitting member between the first set or scene and the camera, forming an image of a portion of the first set or scene directly through the light transmitting member on a frame of the camera, simultaneously forming an image of the second set or scene on the same frame by a reflecting surface on the light transmitting member and at the same time causing overlapping of the adjacent portions of the images in a zone of mergence, said light transmitting member extending beyond the reflecting surface for blending in the zone of mergence the overlapped edges of the two images into each other by the coordination of the reflecting surface and the transparent member, bringing out the distinctness of the blending zone for the full width thereof by a lens located exteriorly of the camera disposed transversely of a light cone from one of the scenes and between the reflecting surface and the last mentioned scene and masking the unexposed portions of the sets or scenes.

4. The art of making composite motion pictures of a set or scene and a second set or scene which comprises arranging a light transmitting member between the first set or scene and the camera, forming an image of a portion of the first set or scene on a frame in the camera directly through the light transmitting member, forming an image on the same frame of the second set or scene with a reflecting surface on the light transmitting member while causing overlapping of the adjacent portions of the images in a zone of mergence, said light transmitting member cooperating with the reflecting surface for blending in the zone of mergence the overlapped edges of the two images, interfitting the two images by a double convex lens disposed transversely of a light cone from one of the scenes and between the reflecting surface and the last mentioned scene while at the same time bringing out distinctly the zone of mergence so that the blending will appear gradually diminishing throughout its extent.

5. The art of making composite motion pictures of a set or scene and a second set or scene complementary to the first set or scene which comprises disposing the first set or scene in the range of a camera, masking a portion of the first set or scene with a reflecting surface on a light transmitting member, removing a portion of the reflecting surface which will correspond in area to the portion of the first set or scene adapted to be photographed, forming an image of the first set or scene on the frame in the camera directly through the window, while at the same time forming an image of the second set or scene on the same frame of the camera by the reflecting surface, said light transmitting member extending beyond the reflecting surfaces for blending in the zone of mergence the overlapped edges of the two images into each other by the coordination of the reflecting surface and the transparent member, and bringing out the distinctness of the blending zone for the full width thereof by a lens disposed transversely of a light cone from one of the scenes, and between the reflecting surface and the last mentioned scene.

6. The art of making composite motion pictures of a set or scene and a second set or scene which comprises arranging a light transmitting member between the first set or scene and the camera, forming an image of a portion of the first set or scene directly through the light transmitting member on a frame of the camera, simultaneously forming an image of the second set or scene on the same frame with a reflecting surface on the light transmitting member and at the same time causing overlapping of the adjacent portions of the images in a zone of mergence, said light transmitting member extending beyond the reflecting surface for blending in the zone of mergence the overlapped edges of the two images into each other by the coordination of the reflecting surface and the transparent member bringing out the distinctness of the blending zone for the full width by a lens disposed transversely of a light cone from one of the scenes, and between the reflecting surface and the last mentioned scene, and causing interfitting of the two images in accordance with the proper scale by moving the lens toward or away from one of the sets or scenes and at the same time controlling the distinctness of the blending zone.

7. The art of making composite motion pictures of a set or scene and a second set or scene which comprises masking a portion of one of the sets or scenes with an opaque reflecting surface on a light transmitting member, removing a portion of the reflecting surface which will permit direct photographing of a portion of one of the sets or scenes through the opening in the reflecting surface, photographing such exposed portion of the set or scene on a portion of a frame in the camera, interfitting the reflecting image with the image formed directly in the camera, blending the adjacent edges of the images into each other by the coordination of the reflecting surface and the transparent member, and photographing the reflected image on the unexposed portion of the frame in the camera and at the same time bringing out the distinctness of the blending zone for the full width thereof by a lens disposed transversely of a light cone from one of the scenes and between the reflecting surface and the last mentioned scene.

8. The art of making composite motion pictures of a plurality of sets or scenes which comprises masking a portion of one of the sets or scenes so that the unmasked portion of the set or scene may be directly photographed by a camera, reflecting an image of the second set or scene in complementary association with the direct image in the camera while blending the adjacent edges of the images of the two scenes in a zone of mergence, bringing out the distinctness of the blending zone for the full width thereof by a lens disposed across the path of the light cone from one of the scenes, varying the width of the zone of mergence while moving the mask relative to the camera, and simultaneously photographing the blended images on the same frame in the camera.

9. The art of making composite motion pictures of a plurality of sets or scenes which comprises masking a portion of one of the sets or scenes so that the unmasked portion of the set or scene may be photographed directly by a camera, reflecting an image of the second set or scene in complementary association with the direct image in the camera while blending and causing overlapping of the adjacent edges of the images of the two scenes in a zone of mergence, varying the width of the zone of mergence at will, and simultaneously photographing the blended images on the same frame in the camera.

10. The art of making composite motion pictures of a plurality of sets or scenes which comprises masking a portion of one of the sets or scenes by a mirror on a transparent member having a sight window in part of the transparent portion so that the unmasked portion of the set or scene may be photographed directly by a camera, reflecting an image of the second set or scene in complementary association with the direct image in the camera, while blending and causing overlapping of the adjacent edges of the images of the two scenes in a zone of mergence, increasing or decreasing the width of the zone of mergence by moving the mirror towards or away from the camera, and simultaneously photographing the blended images on the same frame of the camera.

11. The art of making composite motion pictures of a set or scene and a complementary set or scene which comprises arranging a light transmitting member between the first set or scene and the camera, forming an image of a portion of the first set or scene directly through the light transmitting member on a frame of the camera, simultaneously forming an image of the second set or scene in the same frame with a reflecting surface on the light transmitting member and at the same time causing overlapping of the adjacent portions of the images in a zone of mergence, said light transmitting member extending beyond the reflecting surface for blending in the zone of mergence the overlapped edges of the two images into each other by the coordination of the reflecting surface and the transparent member, varying the width of the zone of mergence by moving the transparent member with the reflecting surface towards or away from the camera, and bringing out the full width of the zone of mergence by a lens disposed across the light cone from one of the scenes.

12. The art of making composite motion pictures of a plurality of sets or scenes whch comprises masking a portion of one of the sets or scenes so that the unmasked portion of the set or scene may be photographed directly by a camera, reflecting an image of the second set or scene in complementary association with the direct image in the camera while blending the adjacent edges of the images of the two scenes in a zone of mergence, varying the width of the zone of mergence while moving the mask relative to the camera, and simultaneously photographing the blended images on the same frame in the camera.

EUGEN SCHÜFFTAN.